United States Patent [19]

Gardner

[11] Patent Number: 5,535,200
[45] Date of Patent: Jul. 9, 1996

[54] SIGNALING SYSTEM FOR A TELECOMMUNICATIONS NETWORK

[75] Inventor: Michael J. Gardner, Overland Park, Kans.

[73] Assignee: Sprint Communications Company L.P., Kansas City, Mo.

[21] Appl. No.: 238,761

[22] Filed: May 5, 1994

[51] Int. Cl.$^6$ .............................. H04Q 11/04; H04J 3/24
[52] U.S. Cl. ..................... 370/60; 370/94.1; 370/110.1
[58] Field of Search .................... 370/110.1, 94.1, 370/60, 60.1, 61, 62, 13, 13.1, 17, 85.13, 94.2, 103, 105, 109, 118; 348/409, 415

[56] References Cited

U.S. PATENT DOCUMENTS

| | | | |
|---|---|---|---|
| 4,646,287 | 2/1987 | Larson et al. | 370/60 |
| 4,734,908 | 3/1988 | Hedlund | 370/60 |
| 4,751,572 | 6/1988 | Baumbaugh et al. | 358/133 |
| 4,819,228 | 4/1989 | Baran et al. | 370/85 |
| 4,903,301 | 2/1990 | Kondo et al. | 381/30 |
| 4,920,534 | 4/1990 | Adelmann et al. | 370/94.1 |
| 4,999,835 | 3/1991 | Lagoutte | 370/94.1 |
| 5,020,058 | 5/1991 | Holden et al. | 370/109 |
| 5,051,983 | 9/1991 | Kammerl | 370/60 |
| 5,058,111 | 10/1991 | Kihara et al. | 370/94.1 |
| 5,313,467 | 5/1994 | Varghese et al. | 370/60 |
| 5,325,358 | 6/1994 | Goeldner | 370/60 |

*Primary Examiner*—Alpus H. Hsu
*Assistant Examiner*—Ricky Ngo
*Attorney, Agent, or Firm*—Harley R. Ball; Michael J. Setter

[57] ABSTRACT

In a telecommunications network using data packets for signaling, network components, such as signal transfer points, service control points, and switches, transfer a signaling packet to the network for transmission to a destination component only if that signaling packet is different from the previous packet sent to the same destination. The signaling packets are transferred over respective virtual channels assigned to respective pairs of network components.

20 Claims, 4 Drawing Sheets

SIGNALING SYSTEM FOR A TELECOMMUNICATIONS NETWORK

BACKGROUND OF THE INVENTION

1. Field of the Invention

The present invention relates to the field of telecommunications. More particularly, the invention is concerned with a telecommunications network using data packets for signaling among network components, such as signal transfer points, switches, service control points, and adjunct processors, in which signaling packets are transferred to the network for transmission to a destination component only if that signaling packet is different from the previous packet sent to the same destination. The signaling packets are transferred over respective virtual channels assigned to respective pairs of network components.

2. Description of the Prior Art

In the prior art, signaling systems such as Signaling System #7 (SS#7) use continuous streams of successive data packets for signaling between network components such as switches, signal transfer points, and adjunct processors. In a typical arrangement, each switch in a network is linked to one or more signal transfer points (STPs) for signaling. The STPs route the signaling packets for the switches and for other network components. These components include service control points and connections with other carriers including both interexchange carriers and local exchange carriers.

In a typical arrangement, two signaling links making up a linkset are provided between each switch and a signal transfer point with each link consisting of a DS0 channel. Two links are provided for redundancy and traffic is purposefully limited so that either link may carry the entire load if the other fails. Network components often divide the traffic equally between companion links.

In the SS#7 environment, a continuous stream of successive signaling packets are generated and sent between interconnected components. These packets include message signal units (MSU), fill-in signal units (FISU) and link status signal units (LSSU). An MSU contains the message for the destination and is the means by which signaling is accomplished within the network. FISUs are used to fill idle time between MSUs on the signaling link and are also important for message sequence control. LSSUs are used for management and control of the associated link. On a given signaling link, MSU loading is typically limited to a maximum of about 35% for steady state operation with the remaining 65% of the link bandwidth being typically occupied by the fill-in units (FISUs). Generally, the LSSUs occupy a negligible percentage of bandwidth.

As network demands increase, signaling capacity must increase also. This can be accomplished by adding additional links, which are added in powers of two in order to keep the loading equally divided. In other words, the allowable number of links between a switch and an STP can include two, four, eight and so forth. As those skilled in the art will appreciate, this can be expensive and presents a substantial waste of bandwidth because typically at least 65% of the capacity is used to carry fill-in units (FISUs).

Additional link capacity can be accomplished by using DS1 channels instead of DS0 channels, for example. However, this represents a similar or even greater waste of bandwidth.

The prior art architecture for signaling presents an additional problem because all of the signaling among the switches is routed through the STPs. An operational failure of a single STP or STP pair can adversely affect the entire network.

Ideally, a network would be configured for associated signaling so that each network component has a dedicated signaling channel with every other component in the network. This would greatly enhance survivability and robustness of network signaling. At present, such an architecture is impractical, however, because the number of linksets would increase geometrically with the number of connected components and the expense would be prohibitive.

There are packet or other data technologies available that would allow a signaling network architecture to be made up of direct virtual links between each pair of network components. Problems still exist however, in that the continuous stream of packets generated by the SS#7 environment would continually load the virtual links, and in reality, convert them into dedicated links requiring extensive bandwidth.

There are also packet or other data technologies available that can be used to reduce the load on a virtual link. One such technology suppresses redundant packets at the transmitting end and regenerates these packets at the receiving end. At present, packet transmission using virtual channels and employing packet suppression has not been applied to large telecommunications network signaling systems, and as a result, there is a still a need for a bandwidth on demand signaling system.

SUMMARY OF THE INVENTION

An embodiment of the present invention is a signaling system for a telecommunications network which comprises a first network component having a means for selecting certain signaling information which is to be removed from a stream of signaling information, and a means for transmitting the stream of signaling information absent signaling information selected from said means for selecting certain signaling information which is to be removed. The invention has a second network component having a means for receiving signaling information, and a generating means for generating signaling information and inserting the generated information in the signaling information received from said means for receiving signaling information. A virtual channel operable for data transmission is connected between said means for transmitting of said first network element and said means for receiving of said second network element.

The present invention also comprises a method of signaling in a telecommunications network. This method comprises the steps of receiving signaling information from a first network component into a first processor connected to the first network component, and generating packets in the first processor from the signaling information received from the first network component. The method also comprises assigning the generated packets to a virtual channel for packet transmission to a second network component, transmitting the packets over the assigned virtual channel to a second processor connected to the second network component, the transmission occurring unless the transmission is suppressed, and suppressing the transmission of packets when the packets to be transmitted over the assigned virtual channel are duplicates of the previous packet transmitted over the assigned virtual channel. The method also comprises receiving packets transmitted from the first processor over the assigned virtual channel into the second processor, and replicating the previous packet received in the second processor over the assigned virtual channel during time intervals in which packet transmission is suppressed on the assigned virtual channel and until another packet is received over the assigned virtual channel, and deriving signaling information from the received and replicated packets in the second processor and delivering the signaling information to the second network component.

The invention further comprises, a signaling system for a telecommunications network which comprises a plurality of processors wherein a processor is connected to each network component that uses the signaling system, a plurality of virtual channels operable for packet transmission wherein there is a virtual channel from each processor to each processor, a signaling platform means in the processors for generating packets from signaling information received from the network components and assigning the packets to a virtual channel, the generation of packets for transmission over the assigned virtual channel occurring only when the packets are not duplicates of the previous packet generated for transmission over the assigned virtual channel, and for removing signaling information from packet transmissions and delivering the signaling information to the network components. The processors also contain a means for transmitting the packets over the assigned virtual channels, and receiving the packets transmitted over the assigned virtual channels.

The invention comprises a method of signaling in a telecommunications network which comprises the steps of receiving signaling information from a first network component into a first processor connected to the first network component, generating packets in the first processor from the signaling information received from the first network component and assigning the generated packets to a virtual channel for packet transmission to a second network component, the generation of packets for transmission over the assigned virtual channel occurring only when the packets are not duplicates of the previous packet generated for transmission over the assigned virtual channel. The method provides for transmitting the packets over the assigned virtual channel to a second processor connected to the second network component, receiving packets transmitted from the first processor over the assigned virtual channel into the second processor, and deriving signaling information from the packets received packets in the second processor and delivering the signaling information to the second network component.

The invention further comprises a method of transmitting information in a signaling system for a telecommunications network, comprising the steps of transmitting to a network element a first data message comprising signaling information, and transmitting to said network element a second data message comprising signaling information when said second data message is different from said first data message.

The invention also comprises a telecommunications signaling system comprising a plurality of network components and a virtual channel connecting at least one of said plurality of network components to at least one other of said plurality of network components. There is also a means for transmitting signaling information over the virtual channel.

DETAILED DESCRIPTION OF THE PREFERRED EMBODIMENT

Figure 1:
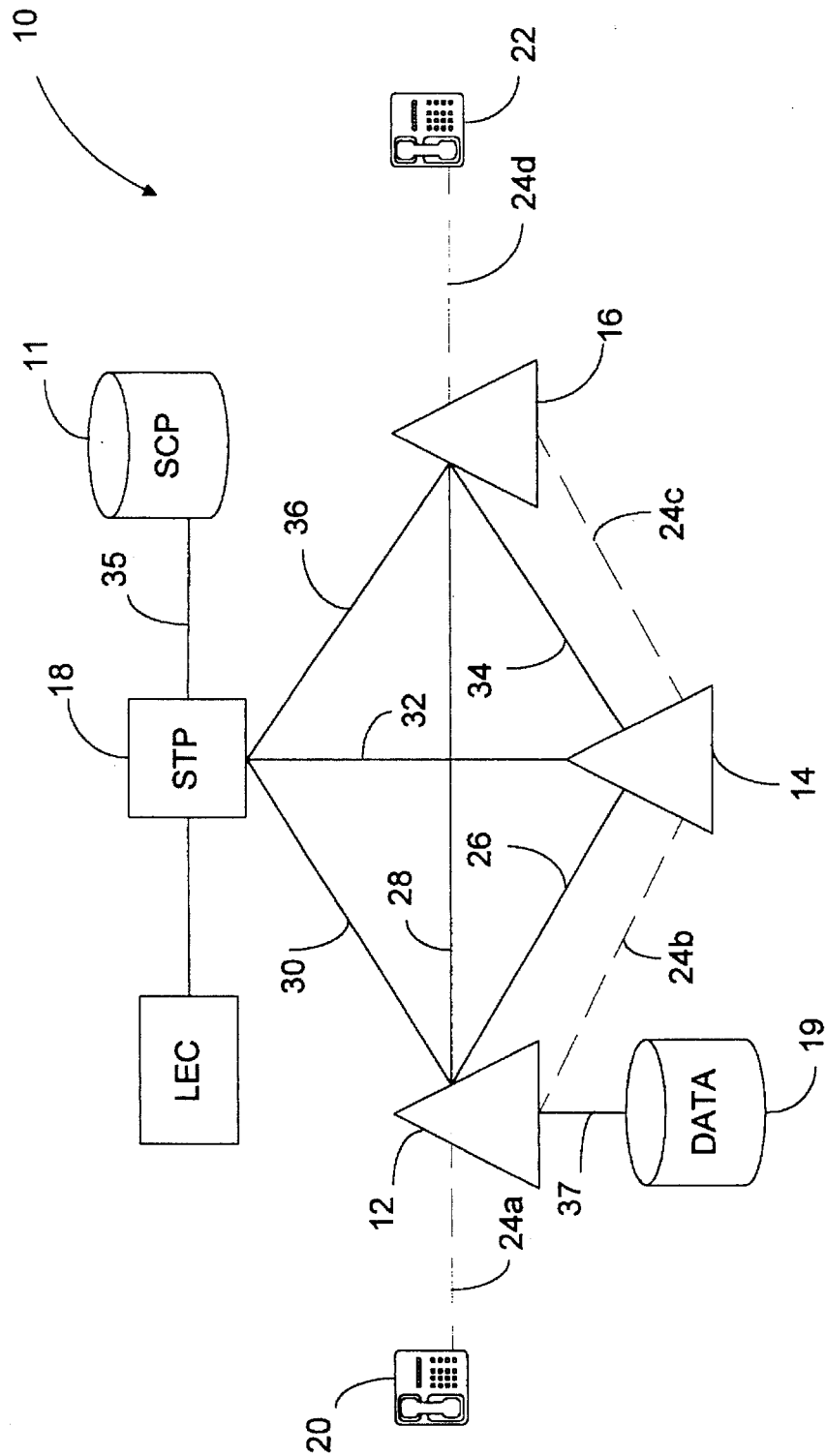
FIG. 1 is a schematic representation of a telecommunications network using the signaling system of the present invention.

FIG. 1 is a schematic representation of a telecommunications network 10 having a plurality of network components including switches 12, 14 and 16, signal transfer point (STP) 18 for routing telecommunications messages to set up circuits between calling stations 20 and 22. As those skilled in the art appreciate, a telecommunications network includes many switches and STPs along with a number of other components such as adjunct processors, service control points (SCPs) and interfaces with other carriers including interexchange carriers (IXCs) and local exchange carriers (LECs). Adjunct processor and SCP may support other network features, for example, billing and intelligent network operations. Adjunct processor 19 and SCP 11 are shown. Voice channels 24a, b, c and d are illustrated in dashed lines and provide the communication capability between stations 20 and 22. Virtual channels 26, 28, 30, 32, 34, 35, 36, and 37 provide the links for signaling among network components 11, 12, 14, 16, 18 and 19. Switches 12, 14 and 16 are telecommunications switches such as DMS-250 units available from Northern Telecom, Inc. Each switch preferably includes a link peripheral processor (LPP) or some other means operable to provide a signaling link interface, such as a SS#7 link, between the switch and the network. The LPP is preferably a subsystem of the switch that communicates directly with the bus of the switch and performs all of the frame relay switching functions, however other protocols or switching techniques are equally contemplated by the present invention.

Figure 2:
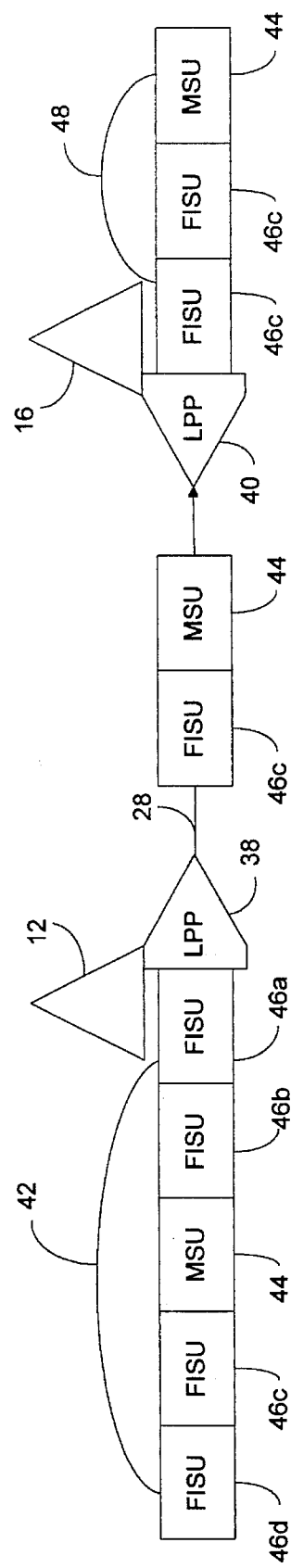
FIG. 2 is a schematic representation of the flow of signaling packets over a virtual channel in accordance with the present invention.

As illustrated in FIG. 2, switch 12 includes, or is otherwise connected to a means operable to provide a signaling link interface such as LPP 38 and switch 16 includes or is otherwise connected to a similar means such as LPP 40. Both LPP 38 and 40 are operable to provide data messages for signaling. Other means for providing such data messages are equally contemplated by the present invention. Preferably, these data messages are in the form of a continuous stream of successive signaling packets 42. In an SS#7 environment, these data messages would typically include a message signal unit (MSU) 44 and fill-in signal units (FISU) 46a, b, c and d used to fill the idle time between message signal units.

In an embodiment of the present invention, LPP 38 does not transfer stream 42 into the network. Instead, each LPP 38, 40, or other means is provided such that a data message is transferred to the network only if it is different from the previous data message. More particularly, each of packets 44 and 46a–d is analyzed and compared to the previous packet. If the packet being analyzed is the same as the previous packet, it is not transferred over virtual channel 28. On the other hand, if the packet being analyzed is different from the previous packet, it is transferred over virtual channel 28 for transmission to the destination—in this example, to LPP 40 of switch 16. This embodiment of the present invention may be particularly advantageous in certain retrofit situations, because of equipment in the installation, it may be advantageous to allow the system to generate data and only transfer to the network for transmission if it is different from the previous packet. In another embodiment of the present invention, the data messages would only be generated if they differed from the previous data message, and all generated data messages would be transferred to the network.

In the example of FIG. 2, FISU 46a is a duplicate of the previous packet (not shown) and is not transferred. Similarly, FISU 46b is a duplicate of both FISU 46a and the previous packet (not shown), and also is not transferred.

The next packet in stream 42 is MSU 44 and this packet is different from the previous packets. Because of this, MSU 44 is transferred to the network for transmission over virtual channel 28 to switch 16. FISU 46c is the next packet in stream 42 and is different from MSU 44. Thus, FISU 46c is also transferred to the network. FISU 46d, however, is the same as FISU 46c and is not transferred. As those skilled in the art appreciate, FISUs are typically repetitive in nature and are only significant when there is a change from one FISU to the next. For example, an FISU may indicate either a positive or negative acknowledgement of a message. If such is the case, a change means that the FISU is different from the previous FISU and it is transferred to the network. LPP 38 also generates signaling packets intended for transmission to other network components. The process described above is the same for packets to be transferred to these other network components. Preferably this process is accomplished by modifying or including a software interface between the frame relay software and the SS#7 software.

Figure 3:
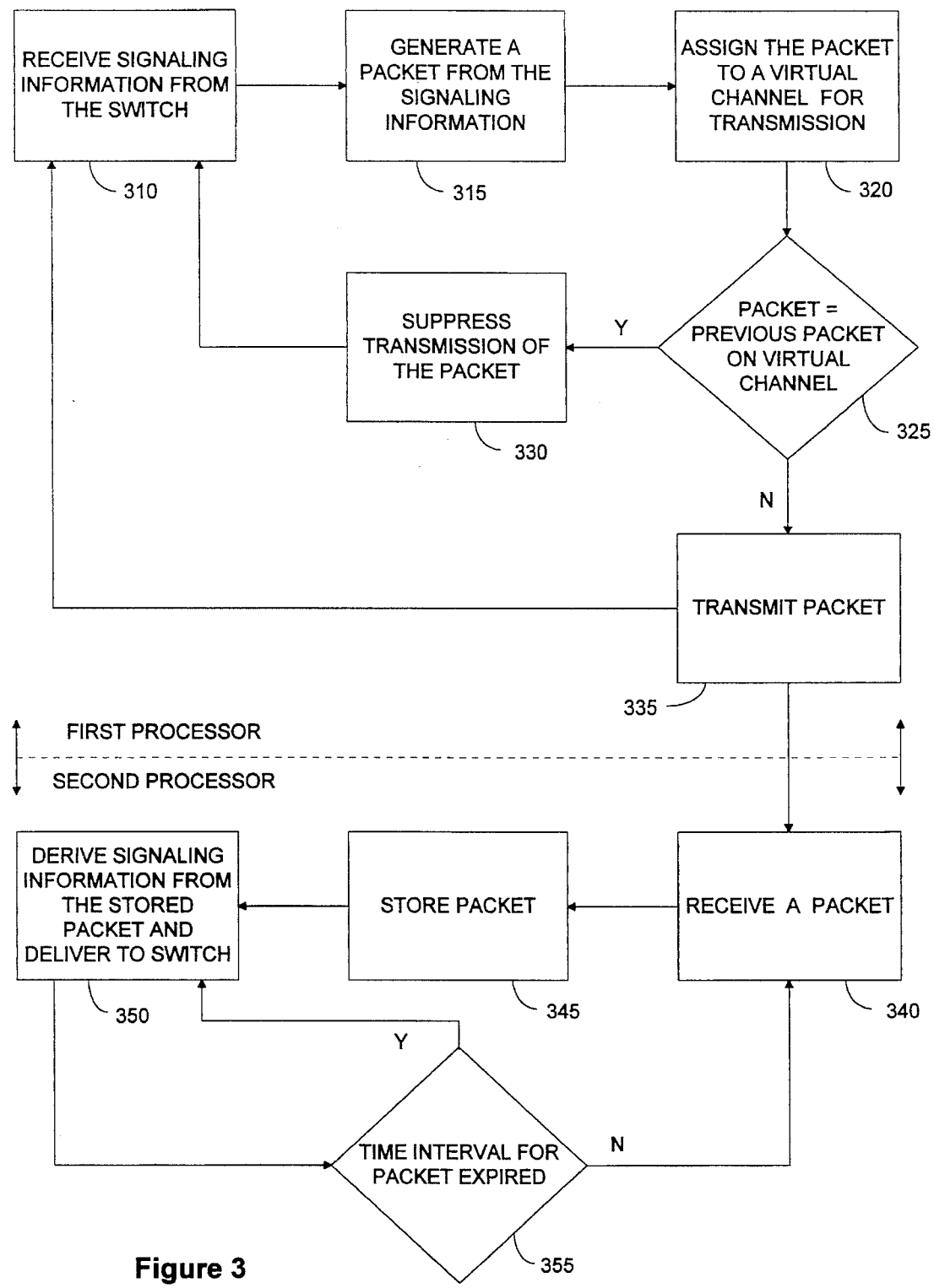
FIG. 3 is a Schematic flow of an interface of one embodiment of the present invention.

FIG. 3 shows the operation of a version of the present invention where packets are transmitted from a first processor to a second processor over a virtual channel. At 310, the first processor receives signaling information from the switch. At 315, the first processor generates a packet from the signaling information. At 320, the first processor assigns the packet to a virtual channel for transmission. At 325, the first processor determines whether the packet to be transmitted over the assigned virtual channel is a duplicate of the previous packet transmitted over the assigned virtual channel. The determination at 325 could be made by storing both the previous packet and the new packet and comparing the two. If the determination is positive (the packets are the same), 330 shows that the first processor suppresses transmission of the packet, and the process returns to 310. If the determination at 325 is negative (the packets are different), the first processor transmits the packet at 335 and the process returns to 310. The second processor receives a packet at 340 and stores the packet at 345. At 350, the second processor derives signaling information from the stored packet and delivers the signaling information to the switch. At 355, the second processor determines if the time interval for receiving another packet has expired. If the time interval has expired, the second processor derives signaling information from the stored packet and delivers the signaling information to the switch. If the time interval has not expired, a packet may be received at 340 until the time interval expires at 355.

The result is that redundant FISUs are eliminated and only packets with new data are transferred to the network—in the example of FIG. 2, only MSU 44 and FISU 46c are transferred and redundant FISUs 46a, 46b, and 46d are eliminated. This means that substantial band-width is made available for additional signaling. In this way, the signaling capability of the network is greatly enhanced without the need for adding linksets or replacing existing links with larger bandwidth channels. Because packet suppression technology is employed, it is practical to use a fast packet transmission on direct virtual links to accommodate the continuous data stream required by the signaling system.

Referring to FIG. 1, each of network components 11–19 and specifically the LPP of each component are also operable for receiving signaling packets from other components and for processing signaling packets for deriving signaling information therefrom. As FIG. 2 illustrates, the packets delivered to LPP 40 are not received in a continuous stream because the bulk of the FISUs were deleted, not generated, or otherwise not transferred at LPP 38. Typical SS#7 processing equipment, however, requires a continuous packet stream. Preferably, to compensate, the interface between the frame relay software and SS#7 software in each LPP is operable to replicate the most recently received packet in order to produce a continuous stream of successive signaling packets for processing.

In the example of FIG. 2, LPP 40 would have been replicating duplicates of the packet similar to FISU 46a. These replicated packets are not shown. LPP 40 receives MSU 44 by way of virtual channel 28 and since MSU 44 is different, LPP 40 transfers MSU 44 to stream 48. FISU 46c is received in the next time interval and becomes the most recently received packet. Thus, MSU 44 is not replicated since a packet was received in the next time slot. After FISU 46c has been received, the next available frame or time interval is empty, and LPP 40 replicates FISU 46c because it is the most recently received packet. LPP 40 continues to replicate FISU 46c until the next packet is received from the network. In this way, continuous stream 48 is generated for processing in LPP 40 with stream 48 being substantially identical to stream 42 generated at LPP 38 at switch 12. Because of this, stream 48 effectively simulates stream 42 including all of the FISUs without the need to use the bandwidth necessary to transmit all of the FISUs. This replacement is also typically accomplished by software modifications, enhancements or additions.

Figure 4:
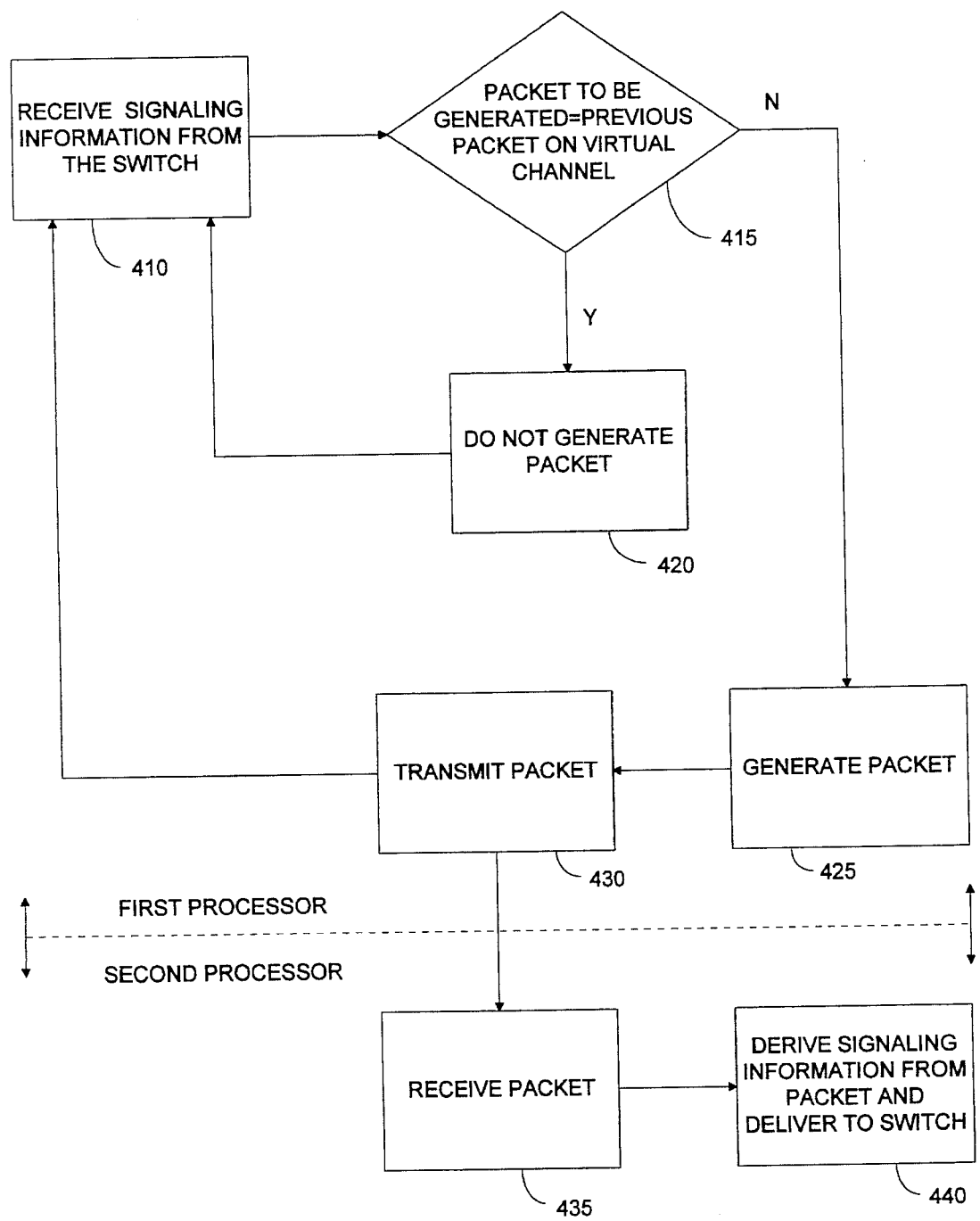
FIG. 4 is a Schematic flow of an interface of an alternative embodiment of the present invention.

FIG. 4 shows the operation of another version of the present invention. At 410, the first processor receives signaling information from a switch. At 415, the first processor determines if a packet which is generated from the signaling information for transmission over an assigned virtual channel would be a duplicate of the previous packet transmitted over the assigned virtual channel. If the determination is positive (the packets would be the same), the first processor does not generate a packet at 420, and the processing then returns to 410. If the determination is negative (the packets would be different), the first processor generates a packet at 425 and transmits the packet at 430. The cycle then returns to 410. The second processor receives a packet at 435, and derives signaling information from the packet and delivers the signaling information to a switch at 440.

As those skilled in the art will now appreciate, the bandwidth on demand signaling system described above is useful in the context of prior art signaling systems having dedicated links between each switch and an assigned STP. By use of the present invention in these prior art systems, existing signaling bandwidth can be used more effectively. It is preferred, however, to provide signaling links by means of virtual channels interconnecting each network component with all of the other network components to create a more robust associated signaling network. This has not been practical in the prior art for large networks due to the continuous stream of signaling data and the quantity of links required.

As illustrated in FIG. 1, each network component 11–19 is connected with every other component by way of virtual channels 26–37. These virtual channels are preferably implemented through data link connection identifier (DLCI) designations in accordance with fast packet techniques well known to those skilled in the art, however other virtual channel connections are equally applicable. Each pair of network components is assigned a virtual channel designation for signaling. As illustrated, component pair 12 and 14 is assigned the designation for virtual channel 26, component pair 12 and 16 is assigned the designation for virtual channel 28, component pair 12 and 18 is assigned the designation for virtual channel 30, component pair 14 and 18 is assigned the designation for virtual channel 32, component pair 14 and 16 is assigned the designation for virtual channel 34, component pair 16 and 18 is assigned the designation for virtual channel 36, component pair 18 and 11 is assigned the designation for virtual channel 35, and component pair 12 and 19 is assigned the designation for virtual channel 37. When a packet is generated, it is assigned a designation for a virtual channel according to the component pair corresponding to the origination and destination components. As the packet is transmitted over the network, it is routed by the various components to its proper destination according to the virtual channel designation. In the example of FIG. 2, packets 44 and 46c are each assigned a designation for virtual channel 28 which routes these packets to switch 16 for reception and processing at LPP 40.

As illustrated, the system of virtual channels includes both switches, signal transfer points (STPs), service control points (SCPs), and adjunct processors. It is preferred that signaling with other carriers be accomplished through the STPs which allows effective interface with carriers using the prior art signaling systems.

It will be appreciated that with a large number of components in a network, a large number of virtual channel designations are required. These are virtual channels, however, and as such, do not require continuous bandwidth. Instead, the only bandwidth required is that sufficient to carry the actual packets being transmitted. This required bandwidth is greatly reduced because of the elimination of the redundant data messages such as redundant packets, and in particular redundant FISUs. The transmission of these signaling packets may use conventional frame relay technology incorporating statistical multiplexing techniques used in frame, cell, and packet switched environments. Likewise, an embodiment of the present invention would also use conventional asynchronous transfer mode technology to transmit packets. The signaling links exist only in a virtual sense as virtual channels. This results in a fully associated network for signaling which has been impractical in the prior art for large networks.

A distinct advance in the art is provided by the present invention which implements a telecommunications network signaling system which employs fast packet transmission over virtual channels that directly link network components; the system made practical through the use of packet suppression technology. The present signaling systems require extensive STPs and DS0 link pairs. The present invention eliminates these requirements with a more robust and efficient architecture that can take advantage of fast packet technology.

Alternatively, in another embodiment of the present invention a packet would be sent, regardless of redundancy, at regular time intervals. One such interval could be 0.25 seconds. The receiving end would then be alerted that transmission had been interrupted if it did not receive at least one packet within the specific time interval.

The present invention solves the prior art problems discussed above and presents a distinct advance in the state of the art. More particularly, the signaling system hereof eliminates the need for transmission of redundant signaling packets over the network and achieves bandwidth on demand for the signaling network. Further, this system provides direct signaling links among network components to create an associated signaling network.

Broadly, the present invention transfers a signaling packet from a network component to the network for transmission to another component only if that packet is different from the previous packet transmitted to the same destination. At the receiving component, the stream of packets is recreated by filling in the time intervals between received packets with generated packets that are replicas of the most recently received packet. In this way, the redundancy of the signaling packets is eliminated and network capacity for messaging is increased.

Further, the present invention creates virtual channel signaling links among selected network components in order to provide associated signaling. Each packet transferred to the network is identified by the virtual channel associated with the destination. With this information and using fast packet techniques, the various packets are multiplexed and routed to the appropriate destinations according to the virtual channel identifications.

As those skilled in the art will appreciate, the present invention encompasses many variations in the preferred embodiment described herein. For example, the LPPs could be modified so that redundant packets are not generated at all. That is, the LPPs would only generate those packets that are not duplicates of a previous packet with the same result as the preferred embodiment in which only packets embodying a change are generated and transferred to the network.

Having thus described the preferred embodiment of the present invention the following is claimed as new and desired to be secured by Letters Patent:

1. A method of signaling in a telecommunications network wherein the telecommunications network is comprised of a plurality of network components that set-up connections for calls to the telecommunications network, and wherein the signaling transfers information between the network components to facilitate the set-up of the connections, wherein the method comprises the steps of:

(a) receiving signaling information from a first network component into a first processor connected to the first network component;

(b) generating packets in the first processor from the signaling information received from the first network component;

(c) assigning the generated packets to a virtual channel for packet transmission to a second network component;

(d) transmitting the packets over the assigned virtual channel to a second processor connected to the second network component, the transmission occurring unless the transmission is suppressed;

(e) suppressing the transmission of packets when the packets to be transmitted over the assigned virtual channel are duplicates of the previous packet transmitted over the assigned virtual channel;

(f) receiving packets transmitted from the first processor over the assigned virtual channel into the second processor, and replicating the previous packet received in the second processor over the assigned virtual channel during time intervals in which packet transmission is suppressed on the assigned virtual channel and until another packet is received over the assigned virtual channel; and (g) deriving signaling information from the received and replicated packets in the second processor and delivering the signaling information to the second network component.

2. The method of claim 1 further comprising the step of repeating steps (a), (b), (c), (d), (e), (f), and (g) at a plurality of pairs of network components.

3. The method of claim 2 wherein the network components are telecommunications network switches and signal transfer points.

4. The method of claim 2 wherein the network components are telecommunications network switches and adjunct processors.

5. The method of claim 2 wherein the network components are telecommunications network switches and service control points.

6. The method of claim 2 wherein the signaling information is based on Signaling System #7.

7. The method of claim 2 wherein the packet transmission is frame relay.

8. The method of claim 2 wherein the packet transmission is asynchronous transfer mode.

9. The method of claim 1 further comprising the step of transmitting at least one packet within a specified time interval over the assigned virtual channel to the second network component regardless of packet redundancy in order to verify uninterrupted data transmission at the second network component.

10. A signaling system for a telecommunications network wherein the telecommunications network is comprised of a plurality of network components that set-up connections for calls to the telecommunications network, and wherein the signaling system transfers information between the network components to facilitate the set-up of the connections, wherein the signaling system comprises:

(a) a plurality of processors wherein a processor is connected to each network component that uses the signaling system;

(b) a plurality of virtual channels operable for packet transmission wherein there is a virtual channel from each processor to each processor;

(c) a signaling platform means in the processors for generating packets from signaling information received from the network components and assigning the packets to a virtual channel, the generation of packets for transmission over the assigned virtual channel occurring only when the packets are not duplicates of the previous packet generated for transmission over the assigned virtual channel, and for removing signaling information from packet transmissions and delivering the signaling information to the network components; and (d) a packet transmission means in the processors for transmitting the packets over the assigned virtual channels, and receiving the packets transmitted over the assigned virtual channels.

11. The system of claim 10 wherein the packet transmission means uses frame relay.

12. The system of claim 10 wherein the packet transmission means uses Asynchronous Transfer Mode (ATM).

13. A method of signaling in a telecommunications network wherein the telecommunications network is comprised of a plurality of network components that set-up connections for calls to the telecommunications network, and wherein the signaling transfers information between the network components to facilitate the set=up of the connections, wherein the method comprises the steps of:

(a) receiving signaling information from a first network component into a first processor connected to the first network component;

(b) generating packets in the first processor from the signaling information received from the first network component and assigning the generated packets to a virtual channel for packet transmission to a second network component, the generation of packets for transmission over the assigned virtual channel occurring only when the packets are not duplicates of the previous packet generated for transmission over the assigned virtual channel;

(c) transmitting the packets over the assigned virtual channel to a second processor connected to the second network component;

(d) receiving packets transmitted from the first processor over the assigned virtual channel into the second processor; and (e) deriving signaling information from the packets received packets in the second processor and delivering the signaling information to the second network component.

14. A method of signaling in a telecommunications network wherein the telecommunications network is comprised of a plurality of network components that set-up connections for calls to the telecommunications network, wherein the signaling is in Signaling System #7 (SS7) format and transfers information between the network components to facilitate the set-up of the connections, and wherein a first signaling processor transmits SS7 signaling messages for a first network component to a second signaling processor for a second network component, wherein the SS7 signaling messages are transmitted over a virtual connection, the method comprises:

(a) transmitting a first SS7 signaling message over the virtual connection from the first signaling processor to the second signaling processor;

(b) transmitting a second SS7 signaling message over the virtual connection from the first signaling processor to the second signaling processor only if the second SS7 signaling message is different from the first SS7 signaling message; and (c) replicating the first SS7 signaling message at the second signaling processor only if the second signaling processor does not receive the second SS7 signaling message over the virtual connection from the first signaling processor.

15. A telecommunications signaling network comprising:

(a) a plurality of network components that are operable to set=up connections for calls to the telecommunications network and that are operable to produce signaling information;

(b) a plurality of signaling processors coupled to the network components, the signaling processors being operable to generate signaling messages in Signaling System #7 (SS7) format from the signaling information to facilitate the set-up of the connections, and wherein the signaling processors are operable to transmit the SS7 signaling messages and receive transmitted SS7 signaling messages;

(c) a plurality of virtual channels interconnecting the signaling processors operable to transfer the SS7 signaling messages transmitted by the signaling processors; and (d) a suppression means residing in each signaling processor for suppressing any SS7 signaling message to be transmitted over a particular virtual channel which duplicates the previous SS7 signaling message transmitted over the particular virtual channel.

16. A signaling system for a telecommunications network wherein the telecommunications network is comprised of a plurality of network components that set-up connections for calls to the telecommunications network, and wherein the signaling in Signaling System #7 (SS7) format and transfers information between the network components to facilitate the set-up of the connections, wherein the signaling system comprises:

(a) a first signaling processor operable to transmit SS7 signaling messages for a first network component;

(b) a second signaling processor operable to receive SS7 signaling messages for a second network component;

(c) a virtual connection operable to transfer SS7 signaling messages from the first signaling processor to the second signaling processor;

(d) a transmission means in the first signaling processor for transmitting a first SS7 signaling message over the virtual connection from the first signaling processor to the second signaling processor, and for transmitting a second SS7 signaling message over the virtual connection from the first signaling processor to the second signaling processor only if the second SS7 signaling message is different from the first SS7 signaling message;

(e) a replication means in the second signaling processor for replicating the first SS7 signaling message only if the second signaling processor does not receive the second SS7 signaling message over the virtual connection from the first signaling processor.

17. The system of claim 16 wherein the first signaling processor is coupled to the first network component and the second signaling processor is coupled to the second network component, wherein the first network component provides signaling information to the first signaling processor for transmission to the second network component, wherein the first signaling processor has a generating means for generating SS7 signaling messages from the signaling information, and wherein the second signaling processor has a derivation means for deriving signaling information from the SS7 signaling messages.

18. The system of claim 17 wherein the first network component and the second network component are telecommunications switches.

19. The system of claim 17 wherein the first network component is telecommunications switch and the second network component is a signal transfer point (STP).

20. The system of claim 17 wherein the first network component is a telecommunications switch and the second network component is a service control point (SCP).

* * * * *